(12) United States Patent
Hu et al.

(10) Patent No.: US 10,797,913 B2
(45) Date of Patent: Oct. 6, 2020

(54) RECIPROCITY BASED FDD FD-MIMO DL CHANNEL CSI ACQUISITION

(71) Applicant: Samsung Electronics Co., Ltd., Suwon-si, Gyeonggi-do (KR)

(72) Inventors: Yeqing Hu, Garland, TX (US); Rui Wang, Mountain View, CA (US); Boon Loong Ng, Plano, TX (US); Young-Han Nam, Plano, TX (US); Jin Yuan, Richardson, TX (US); Gary Xu, Allen, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 16/252,252

(22) Filed: Jan. 18, 2019

(65) Prior Publication Data
US 2019/0229953 A1    Jul. 25, 2019

Related U.S. Application Data

(60) Provisional application No. 62/620,211, filed on Jan. 22, 2018.

(51) Int. Cl.
*H04L 25/02* (2006.01)
*H04L 5/14* (2006.01)
(Continued)

(52) U.S. Cl.
CPC ....... *H04L 25/0224* (2013.01); *H04B 7/0413* (2013.01); *H04B 7/0469* (2013.01);
(Continued)

(58) Field of Classification Search
CPC ... H04W 24/10; H04B 7/0413; H04B 7/0634; H04B 7/0469; H04B 7/10; H04L 5/14;
(Continued)

(56) References Cited

U.S. PATENT DOCUMENTS

| 2013/0003789 A1* | 1/2013 | Eom | H04B 7/10 375/219 |
| 2014/0192768 A1* | 7/2014 | Yeh, II | H04B 7/0478 370/330 |

(Continued)

OTHER PUBLICATIONS

Deepak Vasisht, et al., "Eliminating Channel Feedback in Next-Generation Cellular Networks", SIGCOMM '16, Aug. 22-26, 2016, Florianopolis, Brazil. 14 pages.

*Primary Examiner* — Shukri Taha

(57) ABSTRACT

Reciprocity base frequency division duplex (FDD) multiple-input-multiple-output (MIMO) downlink (DL) channel Channel-State Information (CSI) acquisition is provided. A base station (BS) includes a transceiver configured to measure uplink (UL) sounding reference signals (SRSs) at a UL carrier frequency, using two polarization components of an antenna array of the BS, and a processor configured to determine a quantity of propagation paths between the BS and a user equipment (UE), for each of the determined propagation paths, extract propagation parameters from the UL SRS measurements, for each of the determined propagation paths, predict a downlink (DL) channel based on the extracted propagation parameters and a DL carrier frequency, and generate a precoding channel matrix for the UE by summing the predicted DL channels for each of the determined propagation paths and for each of the two polarization components of the antenna array of the BS.

20 Claims, 15 Drawing Sheets

(51) Int. Cl.
*H04B 7/10* (2017.01)
*H04B 7/0413* (2017.01)
*H04B 7/0456* (2017.01)
*H04L 5/00* (2006.01)

(52) U.S. Cl.
CPC ............... *H04B 7/10* (2013.01); *H04L 5/14* (2013.01); *H04L 5/0023* (2013.01); *H04L 5/0051* (2013.01)

(58) Field of Classification Search
CPC .. H04L 5/0023; H04L 5/0051; H04L 25/0224
See application file for complete search history.

(56) References Cited

U.S. PATENT DOCUMENTS

| | | | |
|---|---|---|---|
| 2016/0191129 A1* | 6/2016 | Noh | H04B 7/10 375/267 |
| 2018/0091207 A1* | 3/2018 | Kakishima | H04B 7/0639 |
| 2019/0190569 A1* | 6/2019 | Nayeb Nazar | H04B 7/0417 |

* cited by examiner

RECIPROCITY BASED FDD FD-MIMO DL CHANNEL CSI ACQUISITION

CROSS-REFERENCE TO RELATED APPLICATION AND CLAIM OF PRIORITY

This application claims priority under 35 U.S.C. § 119(e) to U.S. Provisional Patent Application No. 62/620,211 filed on Jan. 22, 2018. The above-identified provisional patent applications are hereby incorporated by reference in their entirety.

TECHNICAL FIELD

This disclosure relates generally to reciprocity base frequency division duplex (FDD) multiple-input-multiple-output (MIMO) downlink (DL) channel Channel-State Information (CSI) acquisition associated with a two dimensional transmit antenna array. Such two dimensional arrays are associated with a type of multiple-input-multiple-output (MIMO) system often termed "full-dimension" MIMO (FD-MIMO)

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure relates to a pre-5th-Generation (5G) or 5G communication system to be provided for supporting higher data rates beyond 4th-Generation (4G) communication system such as Long Term Evolution (LTE).

In a first embodiment, a base station (BS) capable of wireless communications is provided. The BS includes a transceiver configured to measure uplink (UL) sounding reference signals (SRSs) at a UL carrier frequency, using two polarization components of an antenna array of the BS, and a processor configured to determine a quantity of propagation paths between the BS and a user equipment (UE), for each of the determined propagation paths, extract propagation parameters from the UL SRS measurements, for each of the determined propagation paths, predict a downlink (DL) channel based on the extracted propagation parameters and a DL carrier frequency, and generate a precoding channel matrix for the UE by summing the predicted DL channels for each of the determined propagation paths and for each of the two polarization components of the antenna array of the BS.

In a second aspect, a method for operating a base station (BS) is provided. The method includes measuring uplink (UL) sounding reference signals (SRSs) at a UL carrier frequency, using two polarization components of an antenna array of the BS, and determine a quantity of propagation paths between the BS and a user equipment (UE), for each of the determined propagation paths, extracting propagation parameters from the UL SRS measurements, for each of the determined propagation paths, predicting a downlink (DL) channel based on the extracted propagation parameters and a DL carrier frequency, and generating a precoding channel matrix for the UE by summing the predicted DL channels for each of the determined propagation paths and for each of the two polarization components of the antenna array of the BS.

In a third aspect, a non-transitory computer-readable medium comprising program code for operating a base station in a communication network, wherein the program code that, when executed by a processor, causes the processor to measure uplink (UL) sounding reference signals (SRSs) at a UL carrier frequency, using two polarization components of an antenna array of the BS, and determine a quantity of propagation paths between the BS and a user equipment (UE), for each of the determined propagation paths, extract propagation parameters from the UL SRS measurements, for each of the determined propagation paths, predict a downlink (DL) channel based on the extracted propagation parameters and a DL carrier frequency, and generate a precoding channel matrix for the UE by summing the predicted DL channels for each of the determined propagation paths and for each of the two polarization components of the antenna array of the BS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 14, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
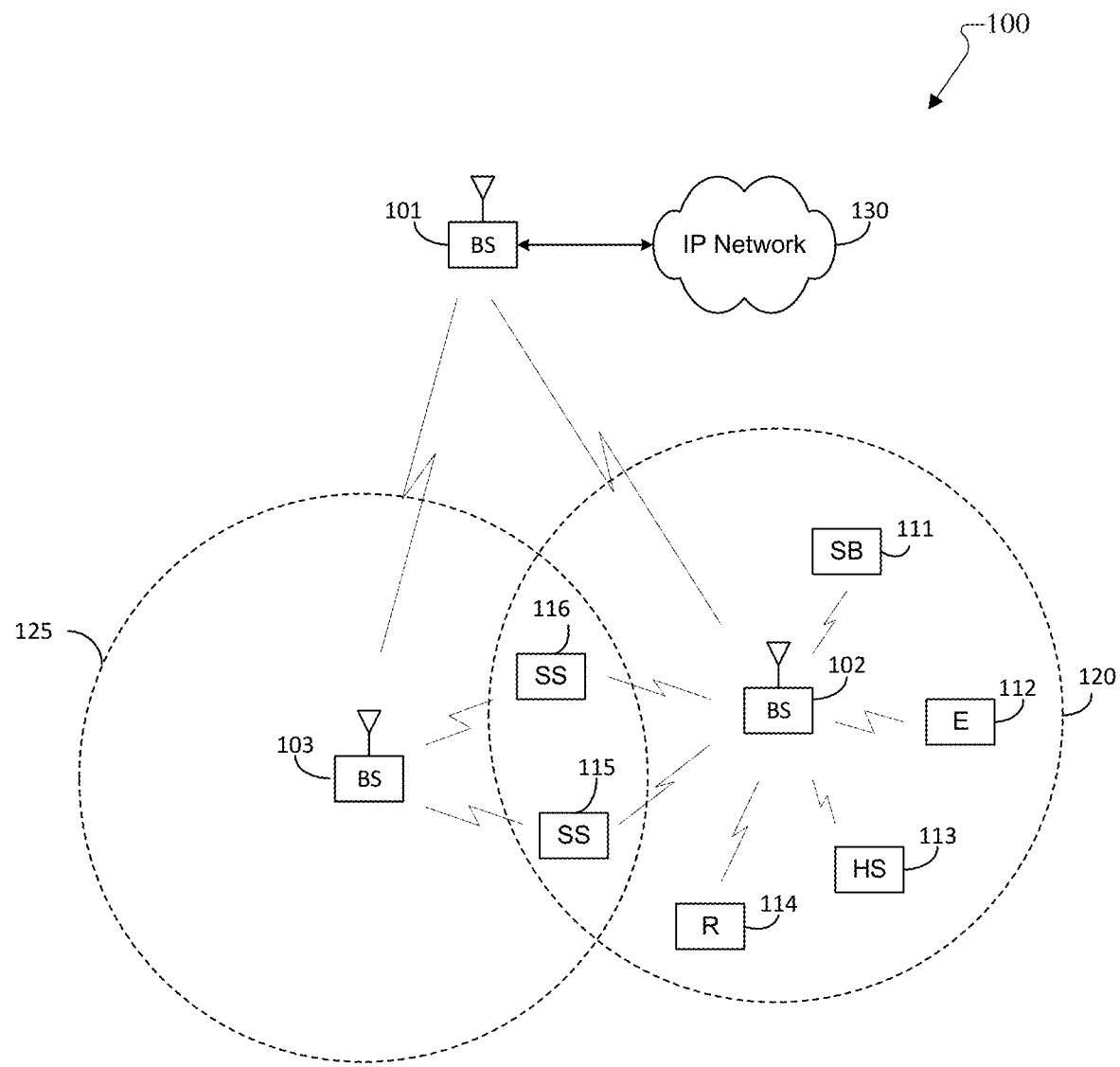
FIG. 1 illustrates an example wireless network 100 according to one embodiment of this disclosure.

FIG. 1 illustrates an example wireless network 100 according to one embodiment of this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB) , a macrocell, a femtocell, a WiFi access point (AP) , or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Some embodiments of the present disclosure are described assuming cellular DL communications. However, the same/similar principles and related signaling methods & configurations can also be used for cellular UL & sidelink (SL)

Mobile speed classification methods described herein rely on obtaining the speed class through estimating the Doppler spread of the underlying mobile radio channel.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
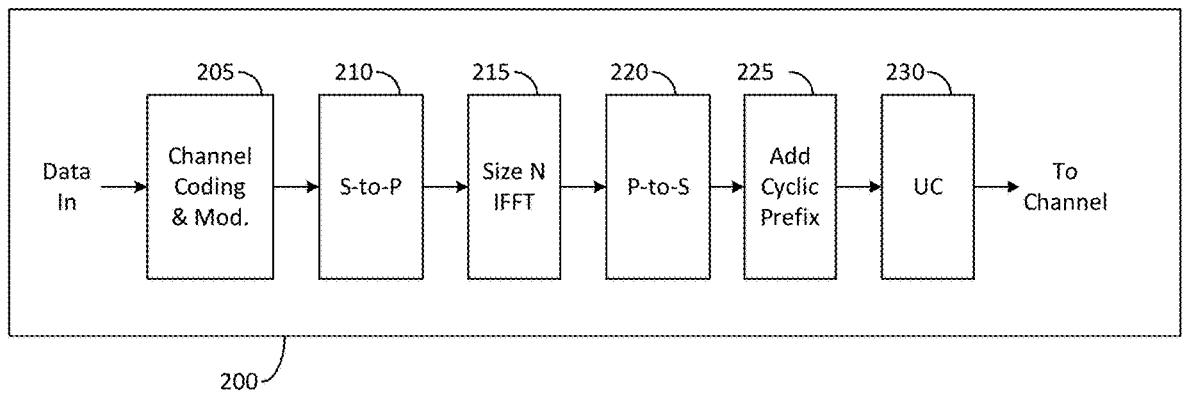
FIGS. 2A and 2B illustrate example wireless transmit and receive paths according to embodiments of this disclosure.
Figure 2B:
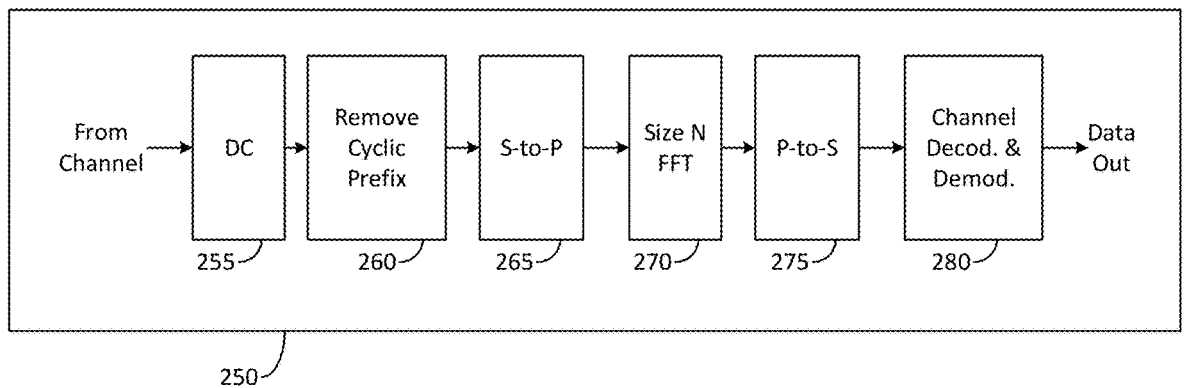

FIGS. 2A and 2B illustrate example wireless transmit and receive paths according to one embodiment of this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
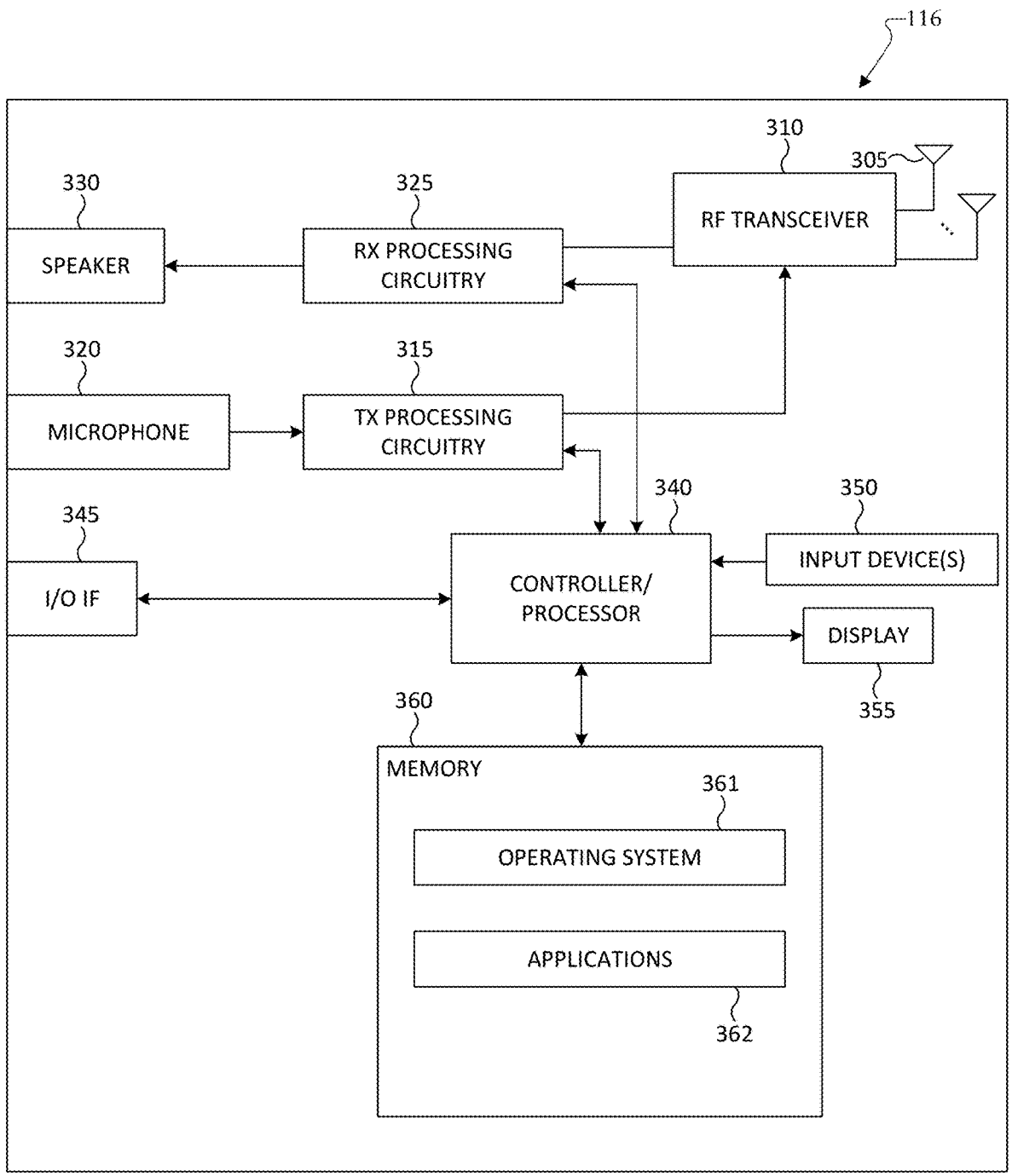
FIG. 3A illustrates an example UE 116 according to one embodiment of this disclosure.

FIG. 3A illustrates an example UE 116 according to one embodiment of this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM). Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
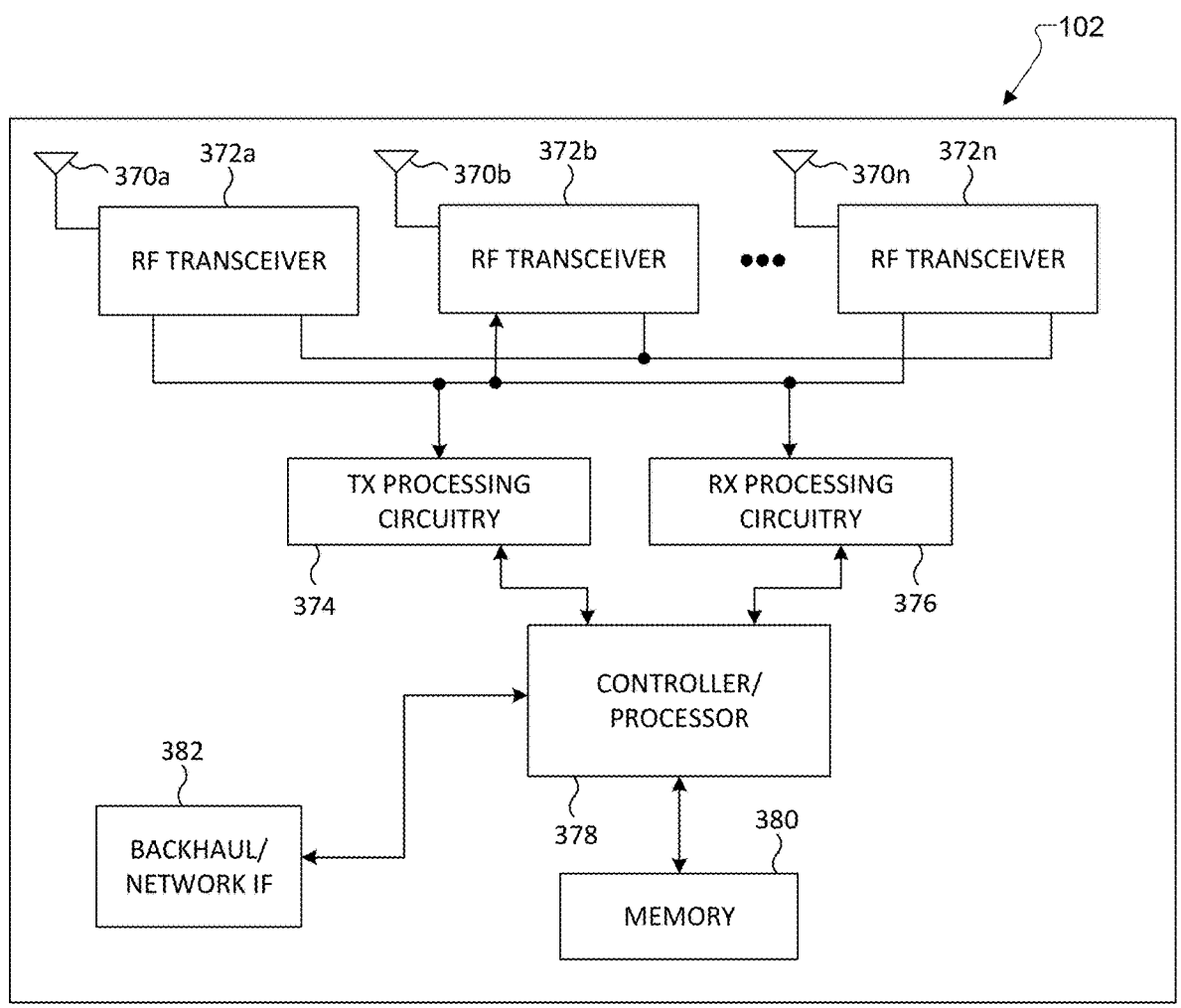
FIG. 3B illustrates an example eNB 102 according to one embodiment of this disclosure.

FIG. 3B illustrates an example eNB 102 according to one embodiment of this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

As described in more detail below, the transmit and receive paths of the eNB 102 (implemented using the RF transceivers 372a-372n, TX processing circuitry 374, and/or RX processing circuitry 376) support communication with aggregation of Frequency Division Duplexing (FDD) cells and Time Division Duplexing (TDD) cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
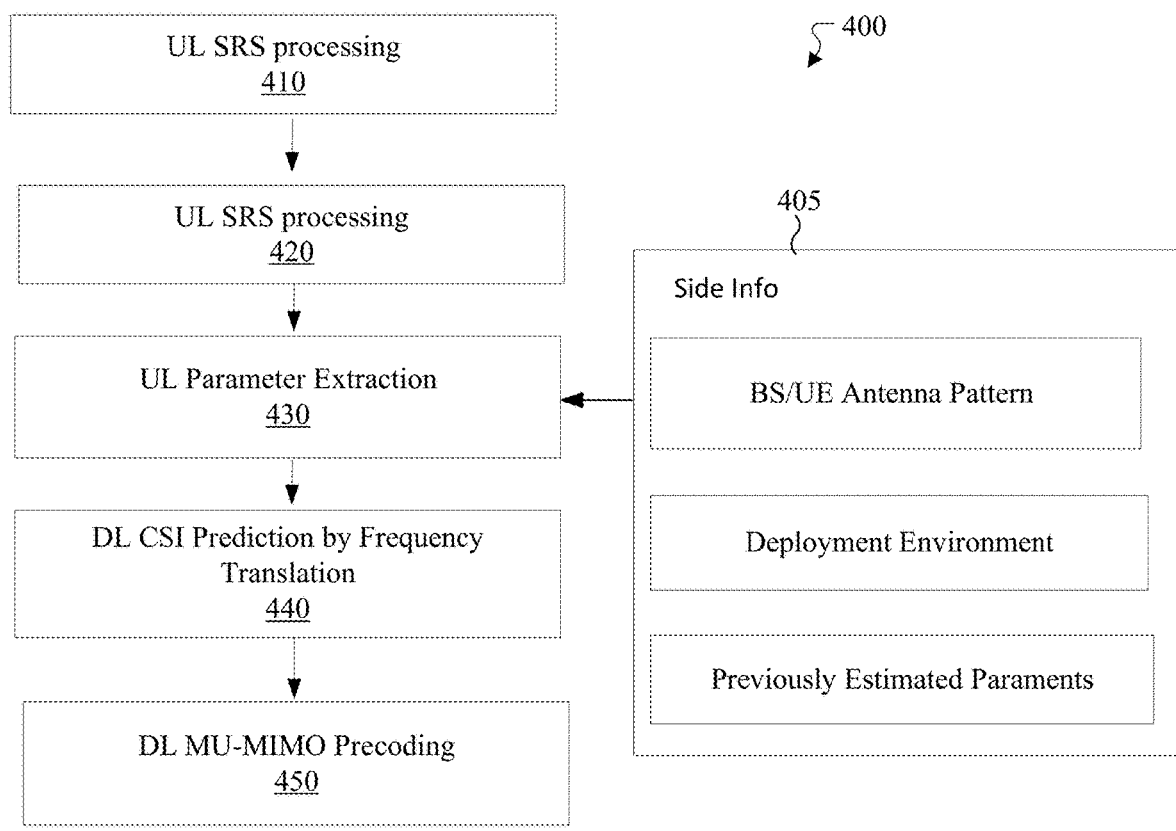
FIG. 4 illustrates an exemplary flowchart for reciprocity base frequency division duplex (FDD)—multiple input multiple output (MIMO) DL channel CSI acquisition according to one embodiment of the present disclosure.

FIG. 4 illustrates an exemplary flowchart 400 for reciprocity base frequency division duplex (FDD)—multiple input multiple output (MIMO) DL channel CSI acquisition according to one embodiment of the present disclosure. The flowchart 400 shown in FIG. 4 is for illustration only. Other embodiments could be used without departing from the scope of this disclosure.

In order to obtain more accurate downlink channel state information (CSI), a frequency division duplex (FDD) system obtains downlink channel information by exploiting the channel partial reciprocity in uplink (UL) and downlink (DL) frequencies. In particular, the CSI acquisition scheme assumes that certain channel physical parameters remain unchanged in UL and DL.

In step 410, the base station measures uplink (UL) sounding reference signals (SRSs) on propagation paths between the BS and a user equipment (UE) at a UL carrier frequency, using two polarization components of an antenna array of the BS.

In step 420, the base station determines the number of dominant propagation paths between the BS and a user equipment (UE). The base station can ignore diffused propagation paths.

In step 430, the base station estimates the UL channel from the sounding reference signal (SRS), extract the physical parameters for each of the determined propagation paths, based on side information 405 including BS and UE antenna patterns, deployment environment and previously estimated parameters.

In step 440, the base station performs frequency translation to predict the DL channel on each subcarrier/resource block, for each of the determined propagation paths.

In step 450, the base station generates a precoding channel matrix for the UE by summing the predicted DL channels for each of the propagation paths and for each of the two polarization components of the antenna array of the BS. The predicted DL channel matrix then can be applied to perform narrow-band multiple user-multiple input multiple output (MU-MIMO) precoding.

In order to obtain more accurate downlink CSI, the present disclosure provides method and apparatus that obtains downlink channel information by exploiting the partial channel reciprocity in UL and DL frequencies of an FDD carrier. In particular, the CSI acquisition scheme assumes that certain channel physical parameters are commonly applicable in UL and DL. The base station (BS) estimates the UL channel from the SRS, extract the physical parameters, and then perform frequency translation to predict the DL channel on each subcarrier/resource block. The predicted DL channel then can be applied to perform sub-band (SB) MU-MIMO precoding.

In the following descriptions, the theoretical foundation of channel modeling, the UL channel parameter extraction operation, and the frequency translation operation for DL channel prediction will be described.

Figure 5:
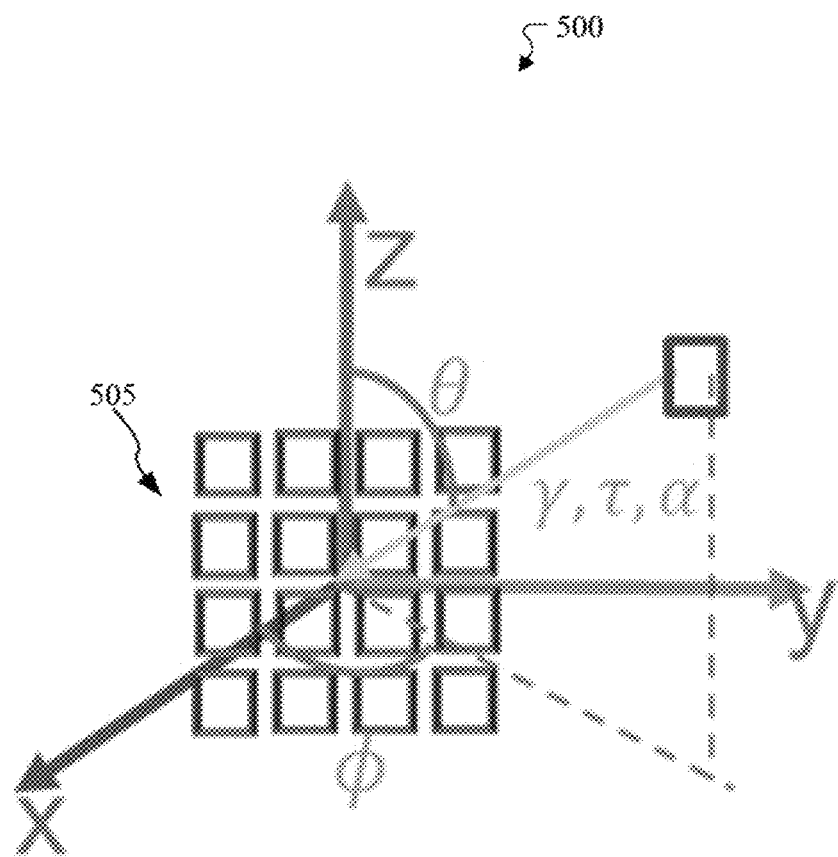
FIG. 5 illustrates three dimensional (3D) channel parameters with respect to an antenna array 505 in accordance with the present disclosure.

FIG. 5 illustrates a diagram 500 of three dimensional (3D) channel parameters with respect to an antenna array 505 in accordance with the present disclosure.

Without loss of generality, the UL channel modeling considers a BS with a planar antenna array 505. The channel between the UE and the BS antennas can be described by a few dominant paths, and some diffused components. The dominant paths capture most of the channel energy. Each path p can be characterized by its delay $\tau_p$, azimuth/elevation angles incidental at the BS ($\phi_{BS,p}, \theta_{BS,p}$), azimuth/elevation angles incidental at the UE ($\phi_{UE,p}, \theta_{UE,p}$), and the Doppler shift $$\frac{v_p}{c_0} f_{UL}$$

which at time instance $t_i$, incurs phase shift $$\left(\frac{v_p}{c_0} f_{UL} t_i\right),$$

where $f_{UL}$ Is the UL carrier frequency, and $c_0$ is the speed of light. Each path also has its amplitude $A_p$, and initial phase $\varphi_p$.

Figure 6:
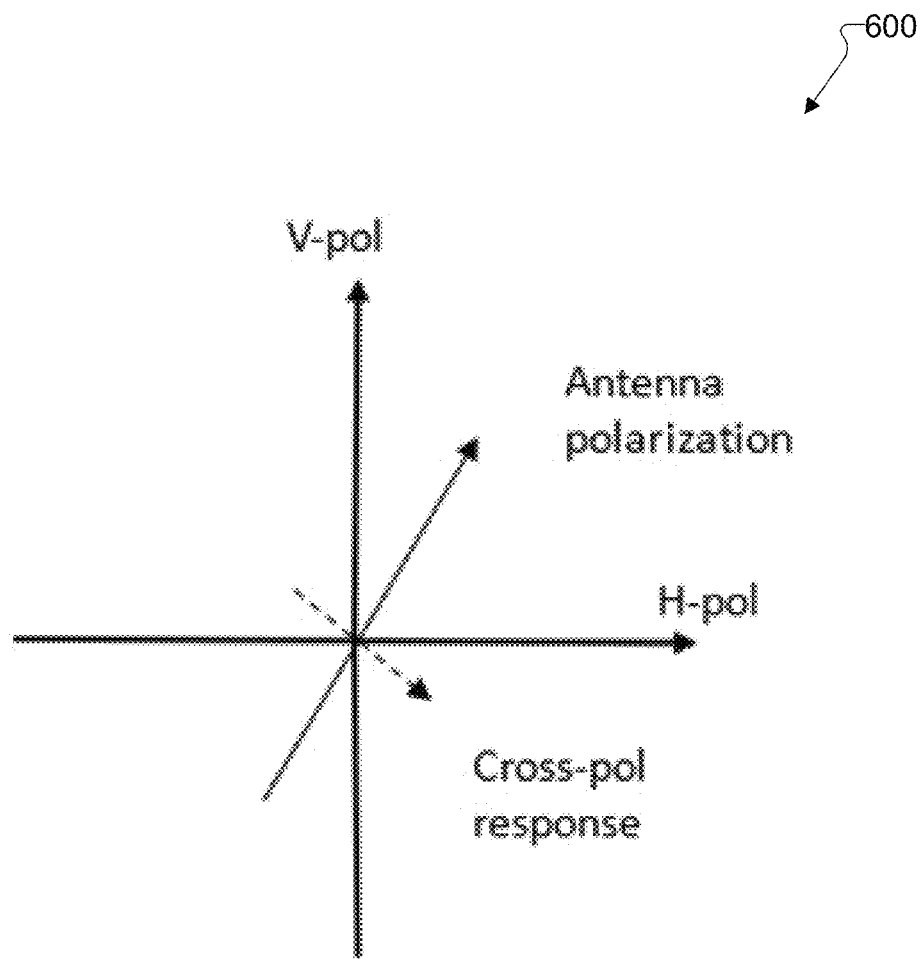
FIG. 6 illustrates an example of how to decompose antenna response into two orthogonal polarization directions according to one embodiment of the present disclosure.

FIG. 6 illustrates a diagram 600 for an example of how to decompose antenna response into two orthogonal polarization directions according to one embodiment of the present disclosure. The embodiment shown in FIG. 6 is for illustration only. Other embodiments could be used without departing from the scope of this disclosure.

In case the BS is mounted with antenna arrays with more than one polarization, or the BS antennas cannot perfectly suppress cross-polarization, in order to fully characterize the channel, the amplitude and initial phase need to consider all possible polarization directions. One widely adopted method is to decompose any polarization into two orthogonal polarization components, e.g. V-polarization and H-polarization component, and model the amplitudes and phases separately. For instance, for path p, the amplitude and phase between V-pol component of BS side and V-pol component of UE side can be written as $A_{p,VV}$, and $\varphi_{p,VV}$, the amplitude and phase between V-pol component of BS side and H-pol component of UE side can be written as $A_{p,VH}$, and $\varphi_{p,VH}$; similarly we can write $A_{p,HH}$, and $\varphi_{p,HV}$; and $A_{p,HV}$, and $\varphi_{p,HV}$. This model is referred to as full polarimetric model. $A_{p,XY} e^{j\varphi_{p,XY}}$ denotes the complex path weight between the X-polarization on BS side and Y-polarization on UE side.

Consider the UL carrier frequency $f_{UL}$, and BS of N antenna ports, UE of K antenna ports, frequency domain channel of $M_f$ resource blocks (RB), and observation at $M_t$ time instances, \when the BS and UE both have only one antenna polarization direction and it is aligned at both ends, the frequency-domain channel can be written as the summation of the frequency-domain channel on the P paths $$H_{UL} = \sum_p h_p(f_{UL}) = \qquad (1)$$

$$\sum_p \begin{bmatrix} b_{BS,1}(\phi_{BS,p}, \theta_{BS,p}, f_{UL}) \\ b_{BS,2}(\phi_{BS,p}, \theta_{BS,p}, f_{UL}) \\ \vdots \\ b_{BS,N}(\phi_{BS,p}, \theta_{BS,p}, f_{UL}) \end{bmatrix} \otimes \begin{bmatrix} b_{UE,1}(\phi_{UE,p}, \theta_{UE,p}, f_{UL}) \\ b_{UE,2}(\phi_{UE,p}, \theta_{UE,p}, f_{UL}) \\ \vdots \\ b_{UE,K}(\phi_{UE,p}, \theta_{UE,p}, f_{UL}) \end{bmatrix} \otimes$$

$$\begin{bmatrix} e^{-j2\pi\Delta f_1 \tau_p} \\ e^{-j2\pi\Delta f_2 \tau_p} \\ \vdots \\ e^{-j2\pi\Delta f_{M_f} \tau_p} \end{bmatrix} \otimes \begin{bmatrix} e^{\frac{j2\pi t_1 v_p f_{UL}}{c_0}} \\ e^{\frac{j2\pi t_2 v_p f_{UL}}{c_0}} \\ \vdots \\ e^{\frac{j2\pi t_{M_t} v_p f_{UL}}{c_0}} \end{bmatrix} e^{-j2\pi\tau_p f_{c,UL}} A_p e^{j\varphi_p}$$

In Equation (1), we denote $$b_{BS}(\phi_{BS,p}, \theta_{BS,p}, f_{UL}) = \begin{bmatrix} b_{BS,1}(\phi_{BS,p}, \theta_{BS,p}, f_{UL}) \\ b_{BS,2}(\phi_{BS,p}, \theta_{BS,p}, f_{UL}) \\ \vdots \\ b_{BS,N}(\phi_{BS,p}, \theta_{BS,p}, f_{UL}) \end{bmatrix}$$

as the BS antenna array response at the arrival direction ($\phi_{BS,p}, \theta_{BS,p}$) and the carrier frequency $f_{UL}$, and $$b_{UE}(\phi_{UE,p}, \theta_{UE,p}, f_{UL}) = \begin{bmatrix} b_{UE,1}(\phi_{UE,p}, \theta_{UE,p}, f_{UL}) \\ b_{UE,2}(\phi_{UE,p}, \theta_{UE,p}, f_{UL}) \\ \vdots \\ b_{UE,K}(\phi_{UE,p}, \theta_{UE,p}, f_{UL}) \end{bmatrix}$$

as the UE antenna array response at the departure direction ($\phi_{UE,p}, \theta_{UE,p}$) and $f_{UL}$. We also denote $$b_f(\tau_p) = \begin{bmatrix} e^{-j2\pi\Delta f_1 \tau_p} \\ e^{-j2\pi\Delta f_2 \tau_p} \\ \vdots \\ e^{-j2\pi\Delta f_{M_f} \tau_p} \end{bmatrix}$$

as the phase shift on the $M_f$ RBs due to the delay of path p($\tau_p$), at each RB frequency (where $\Delta f_i$ denotes the frequency offset of the i-th RB), and the $$b_t(v_p, f_{UL}) = \begin{bmatrix} e^{j2\pi t_1 v_p f_{UL}/c_0} \\ e^{j2\pi t_2 v_p f_{UL}/c_0} \\ \vdots \\ e^{j2\pi t_{M_t} v_p f_{UL}/c_0} \end{bmatrix}$$

as phase shifts caused by a Doppler shift and observed at the $M_t$ time instances ($t_1, t_2, \ldots t_{M_t}$). Let us denote $\gamma_{UL,p} = A_p e^{j\varphi_p - j2\pi\tau_p f_{c,UL}}$ as the complex coefficient of the p-th path, including the amplitude $A_p$, the initial phase $\varphi_p$, and the phase shift caused by the distance travelled by the path with carrier frequency, i.e. $\tau_p f_{c,UL}$.

Based on the above definition, the frequency-domain UL channel can be rewritten as $$H_{UL} = \sum_p b_{BS}(\phi_{BS,p}, \theta_{BS,p}, f_{UL}) \otimes b_{UE}(\phi_{UE,p}, \theta_{UE,p}, f_{UL}) \otimes b_f(\tau_p) \otimes b_t(v_p, f_{UL}) \gamma_{UL,p} \quad (2)$$

where $\otimes$ denotes the kronecker product.

This expression includes the channel coefficients observed at the BS antenna ports and UL antenna ports, the frequency resource blocks, and the time snapshots. From the above model, the specular components of the channel can be characterized by knowing the parameters ($\phi_{BS,p}, \theta_{BS,p}, \phi_{UE,p}, \theta_{UE,p}, f_{UL}, A_p, \tau_p, \varphi_p, v_p$) on each dominant path. On the other hand, assuming the UL and DL channel experience the same propagation environment, and knowing the above parameters and the DL frequency $f_{DL}$, we can characterize the DL channel.

In the full polarimetric model, as described above, each antenna element's response is decomposed into two orthogonal component, e.g. V & H polarization, denoted as $b_{BS,V}(\ldots)$ and $b_{BS,H}(\ldots)$ for BS antenna response, and $b_{UE,V}(\ldots)$ and $b_{UE,H}(\ldots)$ for BS antenna response. In case of perfect monopole antennas, one can align the actual antenna polarization direction as one component (say, V-pol component), and hence the other component (say, H-pol) is zeros. The channel response of one path, p, can be expressed as the summation of 4 polarization combinations:

$$h_p(f_{UL}) = b_{BS,V}(\phi_{BS,p}, \theta_{BS,p}, f_{UL}) \otimes b_{UE,V}(\phi_{UE,p}, \theta_{UE,p}, f_{UL}) \otimes b_f(\tau_p) \otimes b_t(v_p, f_{UL}) e^{-j2\pi\tau_p f_c, UL} A_{p,VV} e^{j\varphi_{p,VV}} + b_{BS,V}(\phi_{BS,p}, \theta_{BS,p}, f_{UL}) \otimes b_{UE,H}(\phi_{UE,p}, \theta_{UE,p}, f_{UL}) \otimes b_f(\tau_p) \otimes b_t(v_p, f_{UL}) e^{-j2\pi\tau_p f_c, UL} A_{p,VH} e^{j\varphi_{p,VH}} + b_{BS,H}(\phi_{BS,p}, \theta_{BS,p}, f_{UL}) \otimes b_{UE,V}(\phi_{UE,p}, \theta_{UE,p}, f_{UL}) \otimes b_f(\tau_p) \otimes b_t(v_p, f_{UL}) e^{-j2\pi\tau_p f_c, UL} A_{p,HV} e^{j\varphi_{p,HV}} + b_{BS,H}(\phi_{BS,p}, \theta_{BS,p}, f_{UL}) \otimes b_{UE,H}(\phi_{UE,p}, \theta_{UE,p}, f_{UL}) \otimes b_f(\tau_p) \otimes b_t(v_p, f_{UL}) e^{-j2\pi\tau_p f_c, UL} A_{p,HH} e^{j\varphi_{p,HH}} \quad (3)$$

The overall channel of all paths is written as $H_{UL} = \sum_p h_p(f_{UL})$. Additional knowledge of full polarimetric coefficients, e.g. $A_{p,VV} e^{j\varphi_{p,VV}}$, $A_{p,VH} e^{j\varphi_{p,VH}}$, $A_{p,HV} e^{j\varphi_{p,HV}}$, $A_{p,HV} e^{j\varphi_{p,HV}}$, $A_{p,HH} e^{j\varphi_{p,HH}}$ is required to characterize the channel. Although one path has different complex weights on different UE/BS antenna polarization pairs, the structural parameters $\phi_{BS,p}, \theta_{BS,p}, \phi_{UE,p}, \theta_{UE,p}, \tau_p$ are common.

UL Channel Parameter Extraction

The frequency-domain channel response of the UE transmitting antenna elements to BS antenna elements on the frequency RBs for different measurement time instances are available at the BS side, from the UL SRS measurements. The SRS measurements can be the actual over-the-air channel. RF chain response is removed from the SRS.

Given $f_{UL}$ is a known parameter in the system, the BS estimates ($\phi_{BS,p}, \theta_{BS,p}, \phi_{UE,p}, \theta_{UE,p}, A_p, \tau_p, \varphi_p, v_p$), and other polarizations complex weights if applicable, for at least one of the dominant channel paths. The parameter estimation can resort to various algorithms, such as maximum likelihood estimation, RiMAX, SAGE, and the like.

When the parameter estimation algorithm relies antenna pattern to estimate the path directions, the basis functions $b_{BS,V}(\phi_x, \theta_x, f_c), b_{BS,H}(\phi_x, \theta_x, f_c), b_{UE,V}(\phi_y, \theta_y, f_c), b_{UE,H}(\phi_x, \theta_x, f_c)$, which is the BS/UE antenna array response of V and H polarization components at any incident angle ($\phi_x, \theta_x$) or ($\phi_y, \theta_y$) and any carrier frequency $f_c$, are prior knowledge known to the BS.

The antenna array basis function on the two orthogonal polarizations is the actual pattern, composed of both amplitude and phase of each antenna element at many possible angles. The antenna pattern prior information closely reflects the reality of the device used. It can be obtained by measurement in an anechoic chamber. Alternatively, it can be theoretically simulated/calculated by considering imperfect factors including antenna array geometry, ground plane of antenna board, element spacing and carrier wavelength, phase center shift, cross-pol leakage and mutual coupling. In one embodiment, the antenna pattern includes a set of amplitudes and phases per each antenna element of the antenna array at possible incident angles, wherein the antenna pattern per each antenna element are decomposed into two orthogonal polarization components.

When estimating the parameters, the following variations can be adopted.

In some embodiments, UE side path direction is not of interest. For example, when the UE has only 1 antenna, or a pair of cross polarization antenna, $b_{UE,V}(\ldots)$ and $b_{UE,H}(\ldots)$ is a scalar number, and $\phi_{UE,p}, \theta_{UE,p}$ are not required to characterize the channel, or when beamforming is only performed by the BS, UE side $\phi_{UE,p}, \theta_{UE,p}$ is not of interest.

In this type of scenario, one can omit UE side antenna response, combine it into the path complex weight, and the BS side algorithm can ignore $\phi_{UE,p}, \theta_{UE,p}$, and only estimate $\phi_{BS,p}, \theta_{BS,p}$. Accordingly, the full polarimetric channel in previous section can be reduced to $$h_p(f_{UL}) = b_{BS,V}(\phi_{BS,p}, \theta_{BS,p}, f_{UL}) \otimes b_f(\tau_p) \otimes b_t(v_p, f_{UL}) \quad (4)$$

$$e^{-j2\pi\tau_p f_c, UL}(b_{UE,V} A_{p,VV} e^{j\varphi_{p,VV}} + b_{UE,V} A_{p,VH} e^{j\varphi_{p,VH}}) +$$

$$b_{BS,H}(\phi_{BS,p}, \theta_{BS,p}, f_{UL}) \otimes b_f(\tau_p) \otimes b_t(v_p, f_{UL})$$

$$e^{-j2\pi\tau_p f_c, UL}(b_{UE,V} A_{p,HV} e^{j\varphi_{p,HV}} + b_{UE,V} A_{p,HH} e^{j\varphi_{p,HH}}) =$$

$$b_{BS,V}(\phi_{BS,p}, \theta_{BS,p}, f_{UL}) \otimes b_f(\tau_p) \otimes b_t(v_p, f_{UL}) e^{-j2\pi\tau_p f_c, UL}$$

$$A_{p,V} e^{j\varphi_{p,V}} + b_{BS,H}(\phi_{BS,p}, \theta_{BS,p}, f_{UL}) \otimes b_f(\tau_p) \otimes b_t(v_p, f_{UL})$$

$$e^{-j2\pi\tau_p f_c, UL} A_{p,H} e^{j\varphi_{p,H}}$$

In this reduced model, 2 complex weights (instead of 4) are associated with each path. The required path parameters reduce to ($\phi_{BS,p}, \theta_{BS,p}, \tau_p, A_{p,V}, \varphi_{p,V}, A_{p,H}, \varphi_{p,H}, v_p$).

In the following embodiments, a UE side path direction is neglected.

For one path, the physical parameters ($\phi_{BS,p}, \theta_{BS,p}, \tau_p, v_p$) are common for both V and H polarization directions of the BS antenna. When the BS is mounted with dual-pol antennas, and each antenna polarization is paired with a digital port, the estimation can be performed in two methods: i) the two polarizations' measured SRS and antenna response can be used jointly to estimate the common parameters, or ii) each polarization observes its own SRS, can the patterns are used independently to perform two separate estimations of the common parameters.

Figure 7:
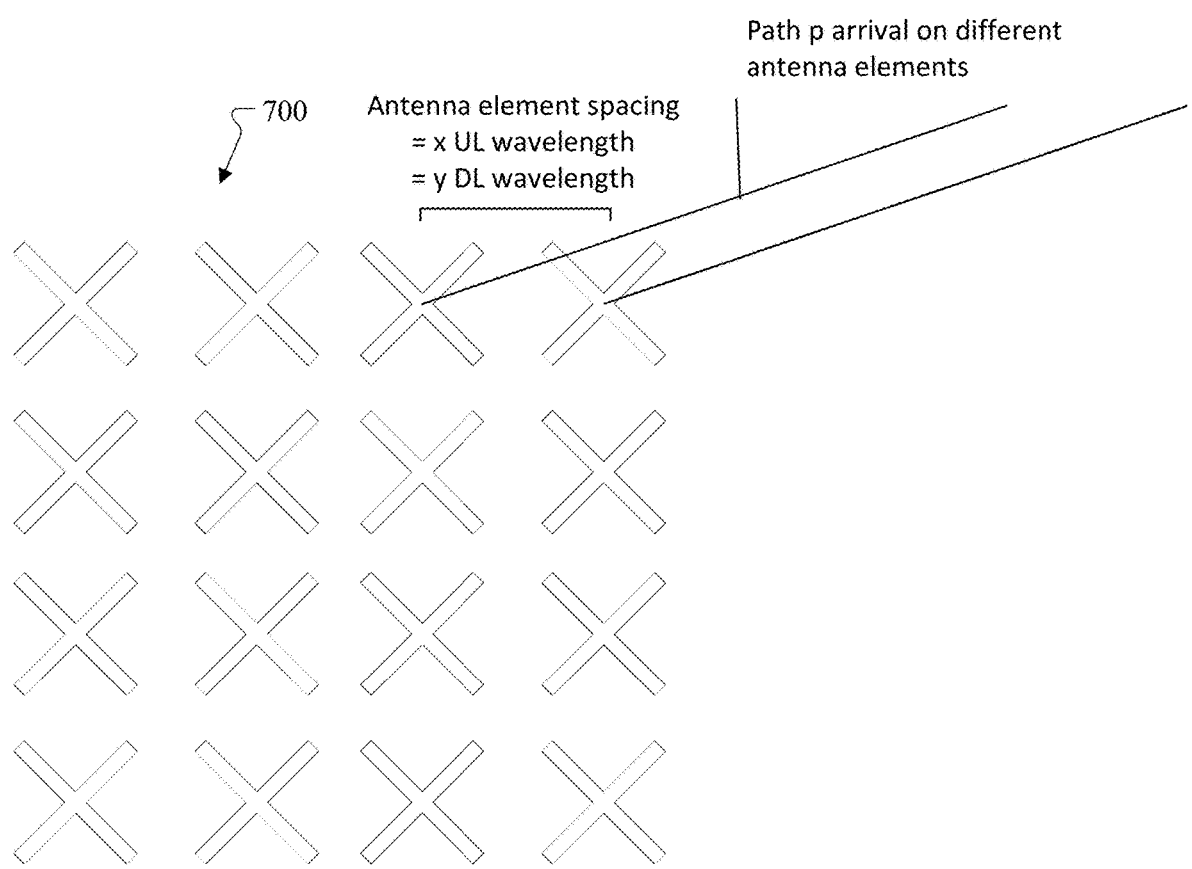
FIG. 7 illustrates an exemplary dual-polarization antenna plane, each polarization corresponds to one digital port, according to one embodiment of the present disclosure.

FIG. 7 illustrates a dual-polarization antenna plane 700, each polarization corresponds to one digital port, according to one embodiment of the present disclosure. The embodiment shown in FIG. 7 is for illustration only. Other embodiments could be used without departing from the scope of this disclosure.

The base station server defines the number of specular paths to be estimated. The number of specular paths can be defined by various factors. Example factors are followings: i) a type of deployment environment (urban, rural, etc.) can determine the range of number of paths. ii) After identifying some paths, the base station server can evaluate the remaining power in the channel and decide if more paths need to be identified. iii) After identifying some paths, the base station can evaluate each path's power and decide if any path need to be dropped, and if certain paths should be merged together. iv) After identifying some paths, the base station server can evaluate the parameters of each path. If some paths have close parameters such that the difference between paths is not important for the channel prediction purpose, or the difference is out of the algorithm's resolution, then those close paths can be merged together.

The base station server can have an option to estimate power of diffuse paths. The estimated power can be used in above variation c to enable more accurate specular path estimations.

Figure 8:
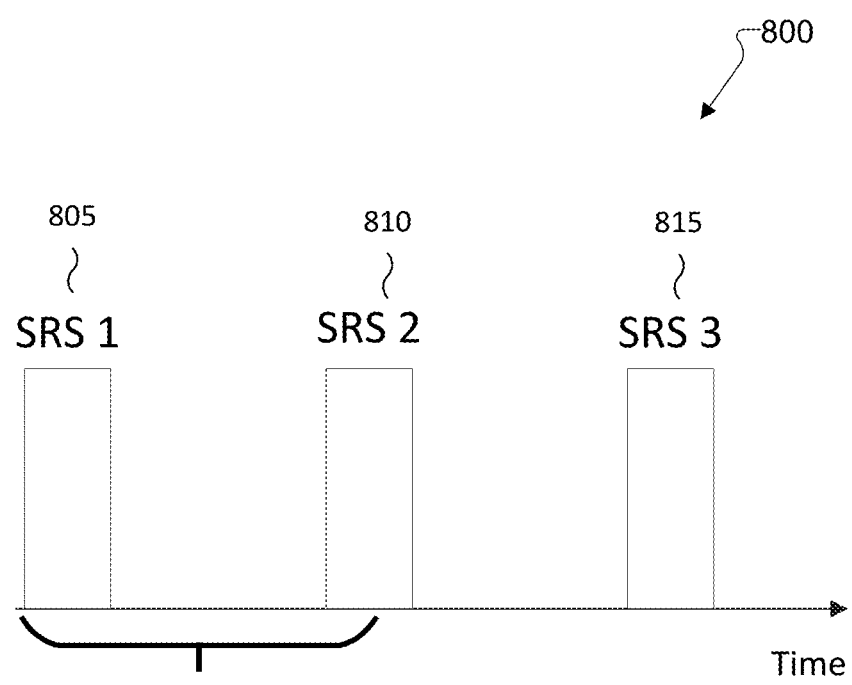
FIG. 8 illustrates exemplary Doppler estimation based on multiple SRSs for according to one embodiment of the present disclosure.

FIG. 8 illustrates an exemplary chart 800 of Doppler estimation based on multiple SRSs according to one embodiment of the present disclosure. The embodiment shown in FIG. 8 is for illustration only. Other embodiments could be used without departing from the scope of this disclosure.

If the base station estimates Doppler, it requires UL SRS measurements from at least two time instances, SRS1 805, SRS 2 810. In some embodiment, UL SRS measurements can be obtained from SRS 1, SRS 2 and SRS 3, 805, 810, 815.

Figure 9:
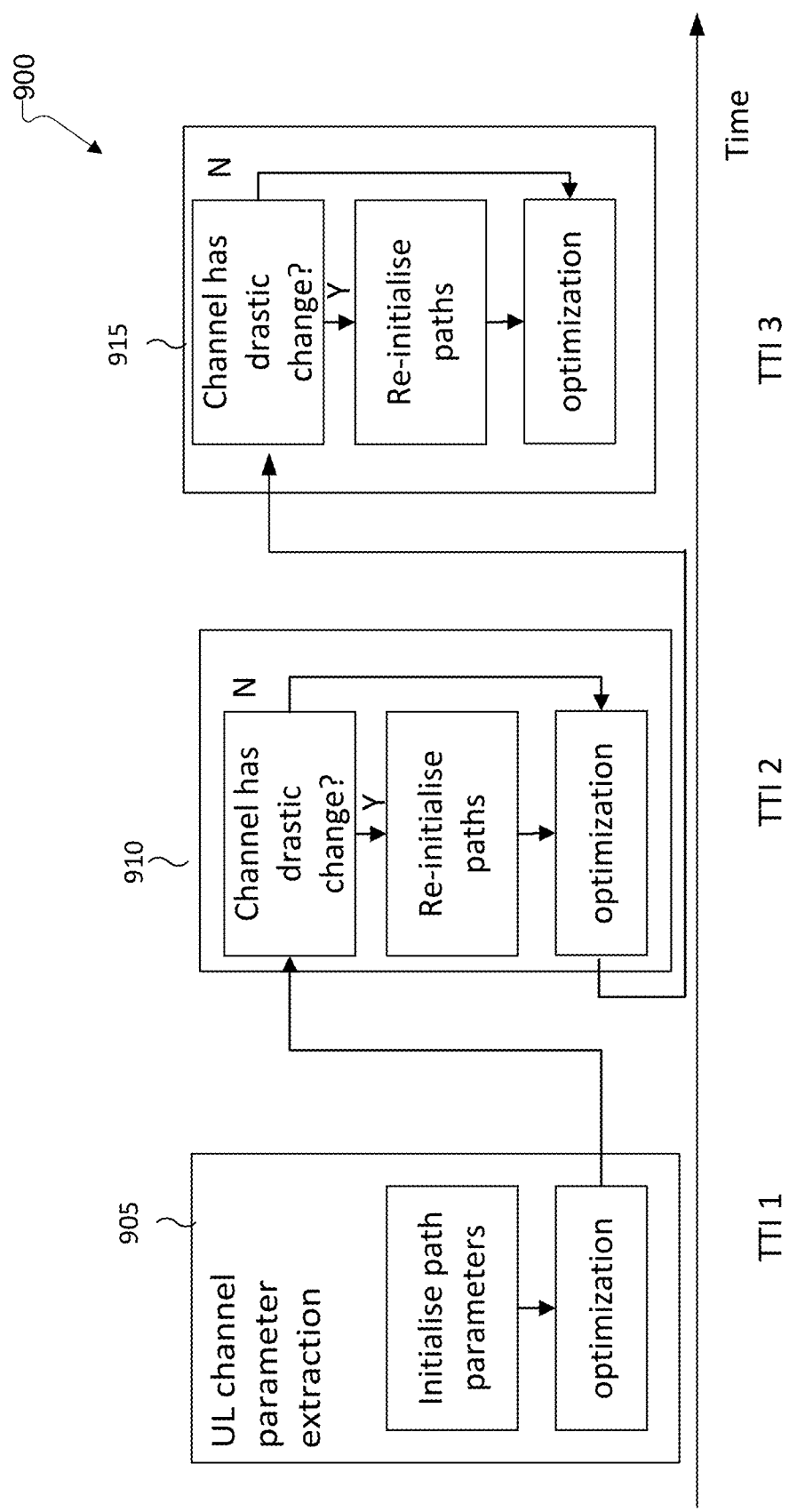
FIG. 9 illustrates an exemplary DL estimation scheme by inheriting previous channel parameters according to one embedment of the present disclosure.
Figure 10:
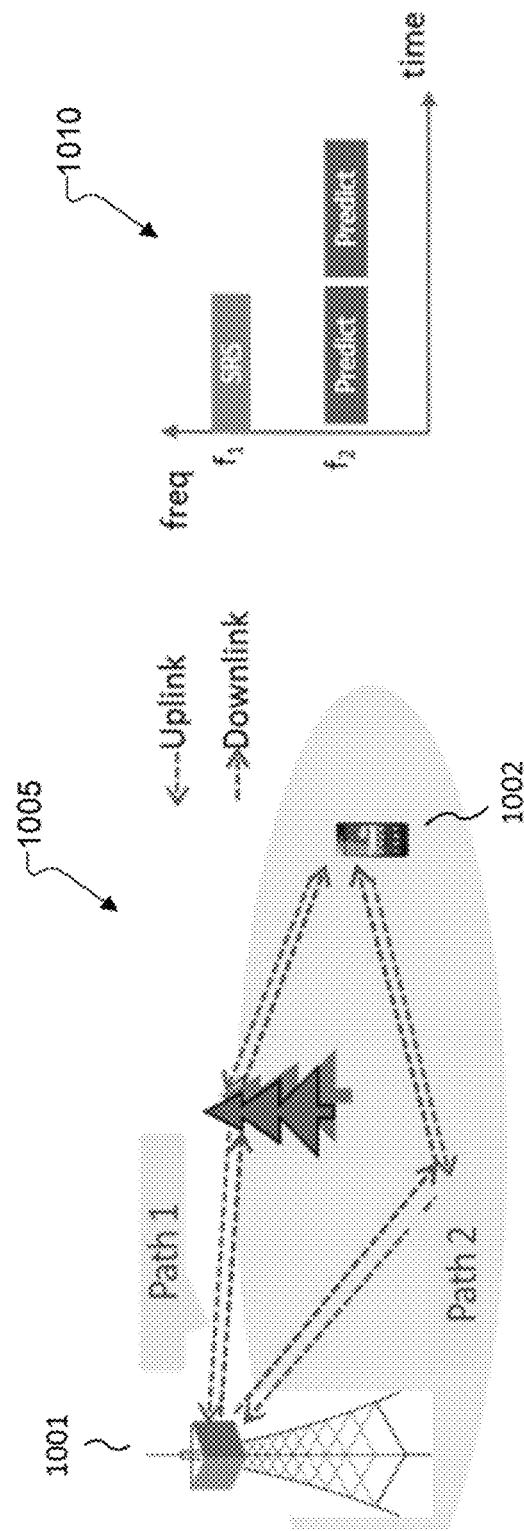
FIGS. 10A and 10B illustrate an exemplary partial channel reciprocity according to embodiments of the present disclosure.

FIG. 9 illustrates an exemplary DL estimation scheme 900 by inheriting previous channel parameters according to one embodiment of the present disclosure. The embodiment shown in FIG. 9 is for illustration only. Other embodiments could be used without departing from the scope of this disclosure.

When the UE is of a low mobility, the effect of Doppler can be neglected. The base station can estimate the parameters other than Doppler based on UL SRS measurements from only one time instance. Another option is, the algorithm can still rely on multiple UL measurements to estimate Doppler, while not compensating the frequency translation in DL prediction.

The DL prediction method can be implemented based on the change rates of the parameters between time instances, including $(\Delta\phi_{BS,p}, \Delta\theta_{BS,p}, \Delta\tau_p, \Delta A_{p,V}, \Delta\varphi_{p,V}, \Delta A_{p,H}, \Delta\varphi_{p,H}, \Delta v_p)$.

The parameters estimated from previous time instances can be used to aid subsequent estimation. For example, if the parameter extraction algorithm is composed of parameter initialization and local optimization, the parameters estimated previously can be used as the initial values for the current estimation. In case the channel has drastically changed, or previous estimation 905 or 910 cannot capture large amount of channel energy, reinitialization in a subsequent estimation 915 needs to be performed. Reinitialization can be re-estimating the channel assuming no previous estimation, or add new paths in addition to previous estimation 905 or 910.

When aliasing exists, i.e. $b_{BS}(\phi_x, \theta_x, f_c)$ has the same response on two different sets of angle of arrivals (AoAs), the parameter extraction algorithm is able to resolve aliasing. Two examples are: rejecting aliasing by signal processing, and limiting the search range of AoA, using prior knowledge of the deployment environment.

DL Channel Prediction

The base station predicts the DL channel at one time instance, $\Delta t$ after the UL SRS is received. We use the dominant paths to represent the DL channel. The DL frequency-domain channel follows the same physics as the UL channel. Assuming the UL and DL travels in the same physical environment, partial reciprocity (i.e. the parameters $(\phi_{BS,p}, \theta_{BS,p}, \phi_{UE,p}, \theta_{UE,p}, A_p, \tau_p, \varphi_p, v_p)$, of each path are highly correlated or identical across UL/DL) holds. Therefore, it can be written as the summation of the channel of the specular paths, as following:

$$H_{DL} = \sum_p h_p(f_{DL}) = \sum_p b_{BS}(\phi_{BS,p}, \theta_{BS,p}, f_{DL}) \otimes b_f(\tau_p) \gamma_{DL,p} = \quad (5)$$

$$\sum_p \begin{bmatrix} b_{BS,1}(\phi_{BS,p}, \theta_{BS,p}, f_{DL}) \\ b_{BS,2}(\phi_{BS,p}, \theta_{BS,p}, f_{DL}) \\ \vdots \\ b_{BS,N_{BS}}(\phi_{BS,p}, \theta_{BS,p}, f_{DL}) \end{bmatrix} \otimes \begin{bmatrix} e^{-j2\pi\Delta f_1 \tau_p} \\ e^{-j2\pi\Delta f_2 \tau_p} \\ \vdots \\ e^{-j2\pi\Delta f_{M_f} \tau_p} \end{bmatrix}$$

$$A_p e^{j\varphi_p - j2\pi\tau_p f_{DL} + j2\pi v_p \Delta t f_{DL}/C_0}$$

In Equation (5), $b_{BS,n}(\phi_{BS,p}, \theta_{BS,p}, f_{DL})$ represents the BS antenna response of the p-th path (characterized by horizontal and elevation incident angles $\phi_{BS,p}, \theta_{BS,p}$ at the BS) at the DL carrier frequency $f_{DL}$, on the n-th BS antenna element. Similarly, $b_{UE,n}(\phi_{UE,p}, \theta_{UE,p}, f_{DL})$ is the antenna element response on the UE side. In addition, $\Delta f_i$ represents the frequency shift of the i-th RB with respect to the carrier frequency, and $e^{-j2\pi\Delta f_i \tau_p}$ represents the phase shift due to the delay of path p, on the i-th RB. $\otimes$ is the Kronecker product, and the above expression describes the frequency-domain DL channel response on every BS and UE antenna element at every RB.

Considering dual-pol BS antenna array, the DL channel model is written as:

$$h_p(f_{DL}) = b_{BS,V}(\phi_{BS,p}, \theta_{BS,p}, f_{DL}) \otimes \quad (6)$$

$$b_f(\tau_p) e^{-j2\pi\tau_p f_{c,DL}} e^{j2\pi v_p \Delta t f_{DL}/C_0} A_{p,V} e^{j\varphi_{p,V}} + b_{BS,H}(\phi_{BS,p},$$

$$\theta_{BS,p}, f_{DL}) \otimes b_f(\tau_p) e^{-j2\pi\tau_p f_{c,DL}} e^{\frac{j2\pi v_p \Delta t f_{DL}}{C_0}} A_{p,H} e^{j\varphi_{p,H}}$$

The dominant paths of the DL channel are reconstructed using the parameters estimated from UL. We perform frequency translation on the basis functions to reconstruct the DL channel.

FIGS. 10A and 10B illustrate examples of the partial channel reciprocity 1005, 1010 according to embodiments of the present disclosure. The embodiments shown in FIGS. 10A and 10B are for illustration only. Other embodiments could be used without departing from the scope of this disclosure.

The frequency translation from a UL channel to a DL channel is composed of the following steps. The base station 1001 compensates the antenna array response at different frequencies of DL and UL. Assume that each path has same incident angles $\phi_{BS,p}, \theta_{BS,p}$ applicable to UL and DL. The antenna array response depends on the incident direction of the path, the element spacing of the array, and the carrier frequency wavelength. The UL and DL wavelengths are different, hence the element spacing seen by the UL/DL wavelength is different. The BS antenna response $b_{BS,n}(\phi_{BS,p}, \theta_{BS,p}, f_{DL})$ can be computed from the estimated angles and known DL frequency, following the same approach as in obtaining uplink antenna response $b_{BS,n}(\phi_{BS,p}, \theta_{BS,p}, f_{UL})$.

The base station 1001 compensates the phase difference at DL frequency due to delay. In the UL, the delay at path p causes the phase shift of $e^{-j2\pi\tau_p f_{UL}}$. In DL, assuming the path has the same delay $\tau_p$ each path causes phase shift of $e^{-j2\pi\tau_p f_{DL}}$.

The initial phase of each path in UL and DL is assumed highly correlated. If the relationship of the phases in UL and DL is known or can be approximated as a function of UL initial phase, i.e. $\varphi_{p,DL} = g(\varphi_{p,UL})$, in DL prediction, the initial phase needs to be compensated by the relationship, i.e. $e^{-j2\pi\varphi_{p,DL}} = e^{-j2\pi g(\varphi_{p,UL})}$. If the relationship is unknown, one can approximate the DL initial phase as the UL initial phase, $e^{-j2\pi\varphi_{p,DL}} = e^{-j2\pi f\tau_p}$.

The DL channels can be predicted in a future time instance $\Delta t$, in the following situations: i) if the location of the UE 1002 remains almost unchanged, and Doppler causes negligible phase change, perform above frequency translation in a,b,c is sufficient; ii) if the UE's location remains almost unchanged, and the Doppler causes non-negligible phase change, compensate the Doppler shift at the required time snapshot $\Delta t$, i.e. $e^{j2\pi v_p \Delta t f_{DL}/C_0}$, or iii) if the UE's location has also changed, and as a results, the parameters ($\phi_{BS,p}$, $\theta_{BS,p}, \tau_p$) have also changed, the estimated rate of change for the parameters needs to be used. The DL channel is reconstructed as:

$$\Sigma_p b_{BS}(\phi_{BS,p}(\Delta t), \theta_{BS,p}(\Delta t), f_{DL}) \otimes b_{UE}(\phi_{UE,p}(\Delta t), \theta_{UE,p}(\Delta t), f_{DL}) \otimes b_f(\tau_p(\Delta t)) \gamma_{DL,p}(t_z) \quad (7)$$

Figure 11:
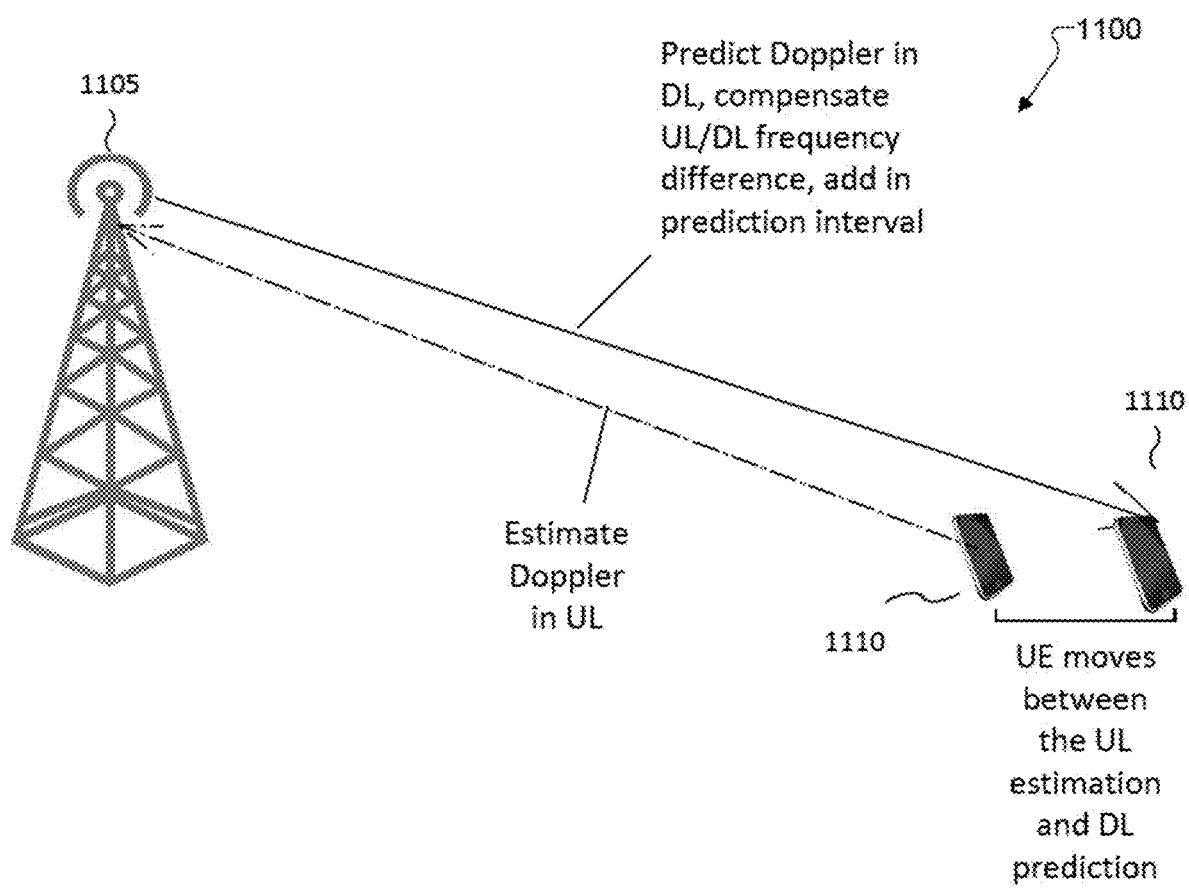
FIG. 11 illustrates an example of predicting a DL channel in a future time instance according to one embodiment of the present disclosure.

FIG. 11 illustrates an example of predicting a DL channel 1100 in a future time instance according to one embodiment of the present disclosure. The embodiment shown in FIG. 11 is for illustration only. Other embodiments could be used without departing from the scope of this disclosure.

The base station 1105 estimates Doppler in UL channel and predicts Doppler in DL channel for a UE 1100 that moves between the UL estimation and DL prediction. Then, the base station compensates a UL/DL frequency difference and add in a prediction interval.

Figure 12A:
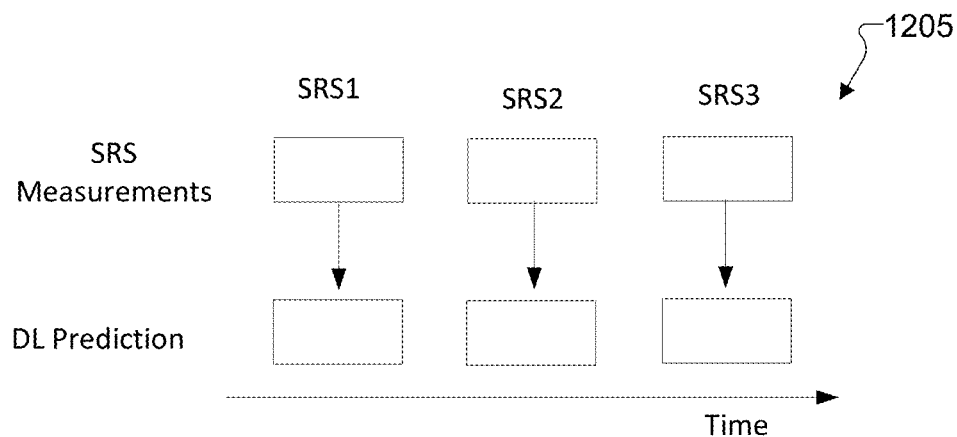
FIG. 12A illustrates an example of instantaneously predicting a DL channel according to one embodiment of the present disclosure.

FIG. 12A illustrates an example of instantaneously predicting a DL channel 1205 according to one embodiment of the present disclosure. The embodiment shown in FIG. 12A is for illustration only. Other embodiments could be used without departing from the scope of this disclosure.

When predicting a DL channel, if a base station takes negligible time to perform a UL parameter extraction and a DL prediction, the UL SRS can be used to predict instantaneous DL channel as illustrated in 12A.

Figure 12B:
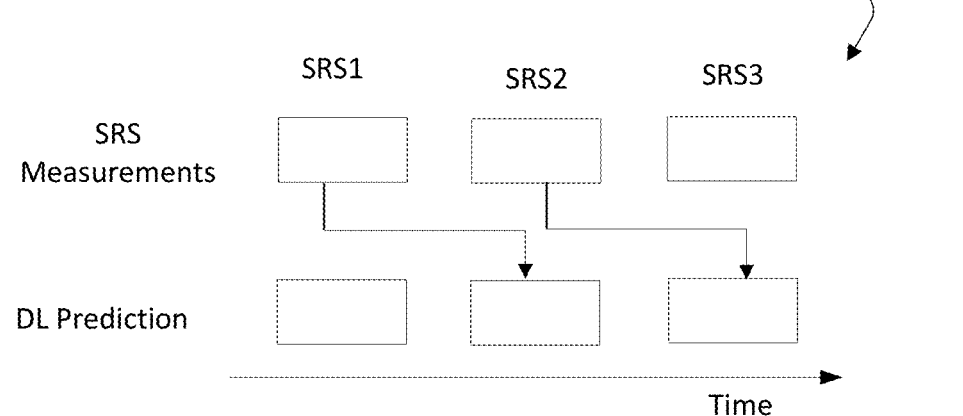
FIG. 12B illustrates an exemplary DL channel prediction according to one embodiment of the present disclosure.

FIG. 12B illustrates an exemplary DL channel prediction 1210 according to one embodiment of the present disclosure. The embodiment shown in FIG. 12B is for illustration only. Other embodiments could be used without departing from the scope of this disclosure.

If the base station sever takes a nonnegligible processing time to perform a DL channel prediction, and UE channel is approximately static between 2 SRS, the base station can use a current SRS to predict a next DL channel as illustrated in 12B.

Figure 12C:
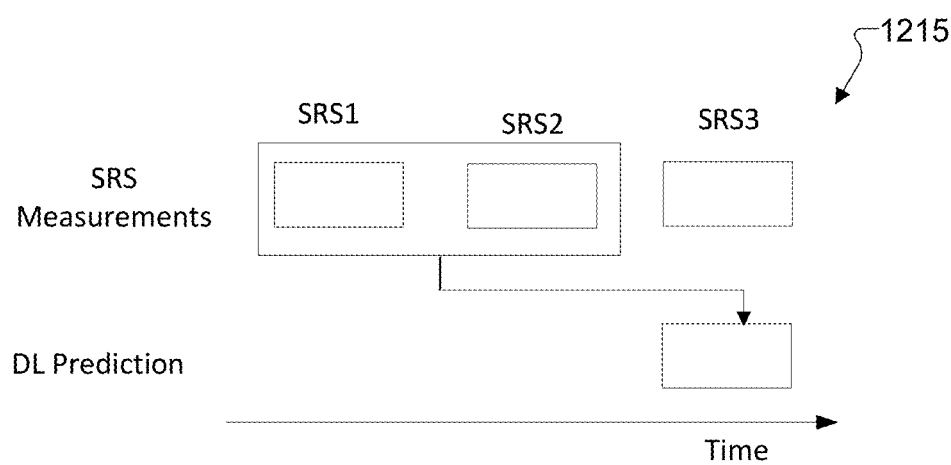
FIG. 12C illustrates an exemplary multiple SRS to predict a next time-slot DL channel according to one embodiment of the present disclosure.

FIG. 12C illustrates an exemplary predict DL channel 1215 in a future time slot according to one embodiment of the present disclosure. The embodiment shown in FIG. 12C is for illustration only. Other embodiments could be used without departing from the scope of this disclosure.

If the base station takes a nonnegligible processing time to perform a DL channel prediction, and a UE channel cannot be approximated static between 2 SRS, the base station server collects at least 2 SRS and estimate Doppler and/or parameter change rates to predict a next DL channel as illustrated in FIG. 12C.

FIG. 12C illustrates an exemplary multiple SRS to predict a next time-slot DL channel according to one embodiment of the present disclosure. The DL over-the-air channel from the BS antenna elements to the UE elements at the RBs is reconstructed from the DL prediction as described above. Then, the server can apply a TX calibration for implementing the DL precoding.

DL Precoder Derivation

Figure 13:
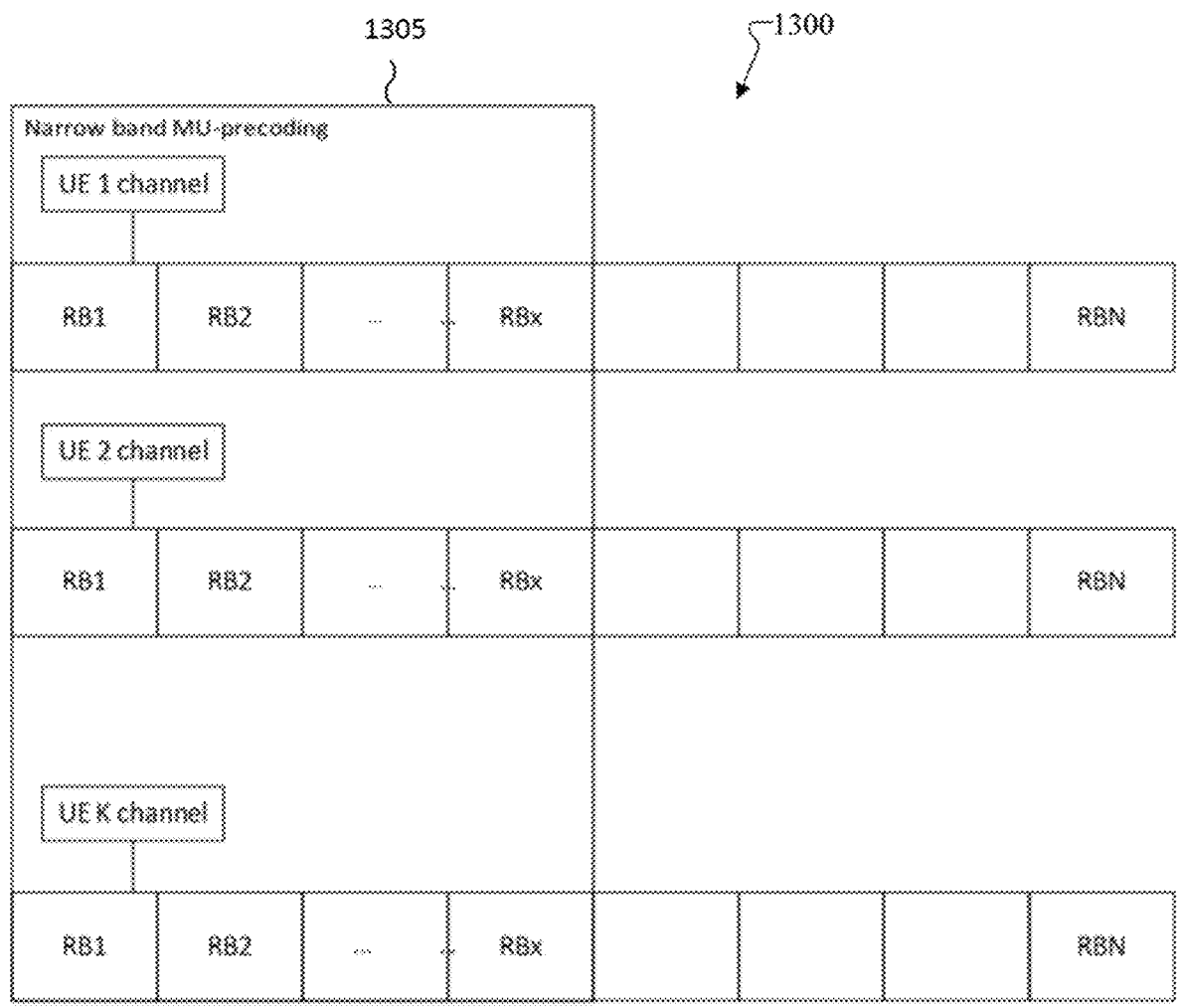
FIG. 13 illustrates an exemplary precoder derivation per resource block group (RBG) according to one embodiment of the present disclosure.

FIG. 13 illustrates an exemplary precoder derivation per resource block group (RBG) 1300 according to one embodiment of the present disclosure. The embodiment shown in FIG. 13 is for illustration only. Other embodiments could be used without departing from the scope of this disclosure.

From the DL channel prediction described above, the DL channels from the BS antenna elements to the UE elements on the resource blocks are available. Narrow band MU-precoding 1305 can be performed on every resource block RB 1~RBx in UE 1channel to UE K channel.

Figure 14:
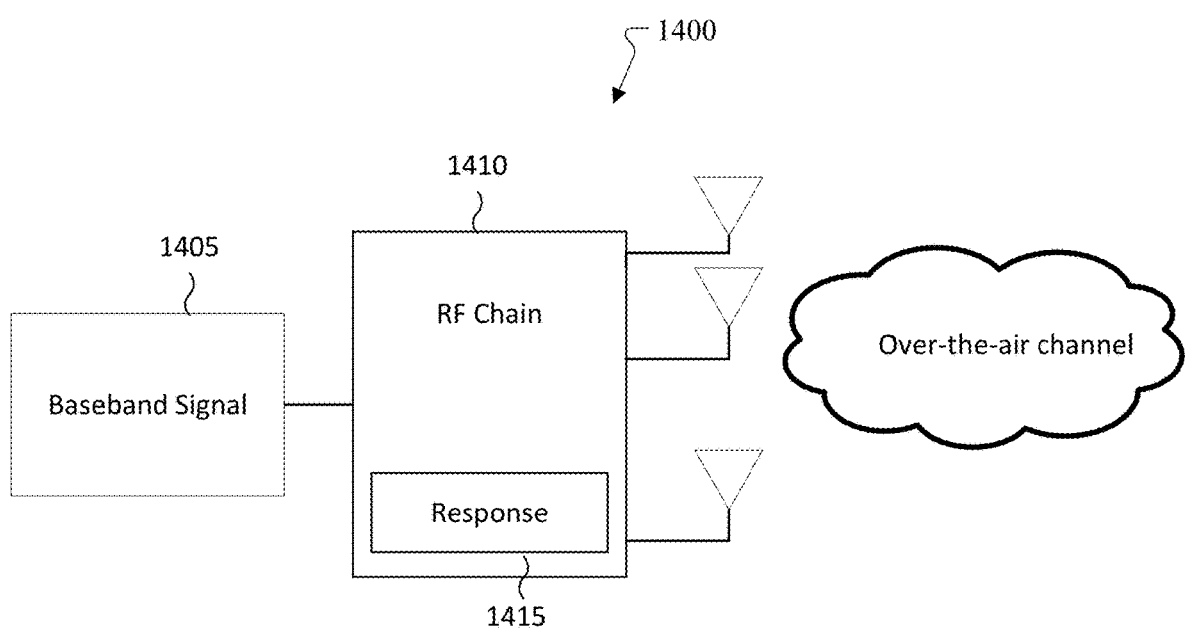
FIG. 14 illustrates an exemplary RF chain according to one embodiment of the present disclosure.

FIG. 14 illustrates an exemplary RF chain 1400 according to one embodiment of the present disclosure. The embodiment shown in FIG. 14 is for illustration only. Other embodiments could be used without departing from the scope of this disclosure.

To obtain over-the-air channel from SRS, BS Rx calibration is required. Calibration removes explicit RF receiver chain response 1415 from the SRS. Denote the pure over-the-air channel as $h_{a,UL}$, RF Rx chain response as $C_R$, after the RF chain, SRS received channel is $h_{a,UL}C_R$, while for parameter extraction purpose, $h_{a,UL}$ is required. Therefore, the RF receiver chain response needs to be known at the UL frequency band. The gain and phase on each sub-carrier or resource block or resource block group needs to be known, and removed from the UL SRS.

In order to obtain true UL over-the-air channel from a base band signal 1405, each RF channel 1410 can have sufficient isolation among each other, such that per antenna SRS do not interfere with each other.

Before using the predicted channel for DL precoding, TX calibration can be applied. Pure over-the-air channel is denoted as $h_{a,DL}$, the RF TX channel on DL frequency band is denoted as $C_T$, and the channel seen by baseband signal is denoted as $C_T h_{a,DL}$. The algorithm predicts DL channel as $\hat{h}_{a,DL}$, and $C_T$ needs to be compensated to calculated precoder using $C_T \hat{h}_{a,DL}$. The gain and phase on each sub-carrier or resource block or resource block group on $C_T$ needs to be known. Isolation requirement is also applicable here.

When UE and BS are not perfectly synchronized by the same clock, there may be slight timing mismatch between UE and BS. As a result, an extra delay offset is introduced into the SRS, which may be time-varying. When estimating the channel parameters and predicting the channel using single snapshot of SRS, for DL precoding purpose, this delay offset does not need to be removed. When estimating the channel parameters using more than 1 snapshots of SRS, the difference of delay offset between SRS snapshots needs to be known and compensated.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station (BS) capable of wireless communications, the BS comprising:
   a transceiver configured to measure uplink (UL) sounding reference signals (SRSs) at a UL carrier frequency using two polarization components of an antenna array of the BS; and
   a processor configured to:
      determine a quantity of propagation paths between the BS and a user equipment (UE);
      for each of the determined propagation paths, extract propagation parameters from the UL SRS measurements;
      for each of the determined propagation paths, predict a downlink (DL) channel based on the extracted propagation parameters and a DL carrier frequency; and
      generate a precoding channel matrix for the UE by summing the predicted DL channels for each of the determined propagation paths and for each of the two polarization components of the antenna array of the BS.

2. The BS of claim 1, wherein the propagation parameters are extracted based on an antenna pattern of the antenna array,
   wherein the antenna pattern includes a set of amplitudes and phases per each antenna element of the antenna array at possible incident angles, and
   wherein the antenna pattern per each antenna element are decomposed into two orthogonal polarization components.

3. The BS of claim 1, wherein the processor is further configured to:
   calculate rates of change of each of the propagation parameters, and
   predict the DL channel further based on the rates of change of each of the propagation parameters,
   wherein the propagation parameters include at least one of incident angles at an arrival direction, a UL carrier frequency, an amplitude, an initial phase, a delay phase shift due to a delay on a propagation path at the UL carrier frequency, and a Doppler phase shift due to Doppler effect.

4. The BS of claim 1, wherein for each of the determined propagation paths, the processor is further configured to predict the DL channel based on an equation using a combination of:
   a BS antenna array response based on an arrival direction of a propagation path and the UL carrier frequency, for each of the two polarization components of the antenna array of the BS,
   a phase shift based on a Doppler shift at an observing time,
   a phase shift on each of resource blocks based on a delay of a propagation path, and
   a complex coefficient of a propagation path based on amplitudes and initial phases for each of the two polarization components of the antenna array of the BS, and a phase shift caused by a delay of a propagation path with the UL carrier frequency.

5. The BS of claim 1, wherein each antenna element of the antenna array is decomposed into two orthogonal polarization components, wherein the two orthogonal polarization components include a vertical component of the antenna array and a horizontal component of the antenna array.

6. The BS of claim 1, wherein the predicted DL channels are compensated based on a radio frequency (RF) transmit (TX) channel response of the BS on the DL carrier frequency.

7. The BS of claim 1, wherein the DL channels for each propagation path are predicted for a same time slot as a measuring time slot for which the UL SRS is measured or for a subsequent time slot next to the measuring time slot, based on rates of change of each of the propagation parameters.

8. A method for operating a base station (BS), the method comprising:
   measuring uplink (UL) sounding reference signals (SRSs) at a UL carrier frequency, using two polarization components of an antenna array of the BS;
   determining a quantity of propagation paths between the BS and a user equipment (UE);
   for each of the determined propagation paths, extracting propagation parameters from the UL SRS measurements;
   for each of the determined propagation paths, predicting a downlink (DL) channel based on the extracted propagation parameters and a DL carrier frequency; and
   generating a precoding channel matrix for the UE by summing the predicted DL channels for each of the determined propagation paths and for each of the two polarization components of the antenna array of the BS.

9. The method of claim 8, wherein the propagation parameters are extracted based on an antenna pattern of the antenna array,
   wherein the antenna pattern includes a set of amplitudes and phases per each antenna element of the antenna array at possible incident angles, and
   wherein the antenna pattern per each antenna element are decomposed into two orthogonal polarization components.

10. The method of claim 8, further comprising:
    calculating rates of change of each of the propagation parameters; and
    predicting the DL channel further based on the rates of change of each of the propagation parameters,
    wherein the propagation parameters include at least one of incident angles at an arrival direction, a UL carrier frequency, an amplitude, an initial phase, a delay phase shift due to a delay on a propagation path at the UL carrier frequency, and a Doppler phase shift due to Doppler effect.

11. The method of claim 8, wherein, for each of the determined propagation paths, the DL channel is predicted based on an equation using a combination of:
    a BS antenna array response based on an arrival direction of a propagation path and the UL carrier frequency, for each of the two polarization components of the antenna array of the BS,
    a phase shift based on a Doppler shift at an observing time,
    a phase shift on each of resource blocks based on a delay of a propagation path, and
    a complex coefficient of a propagation path based on amplitudes and initial phases for each of the two polarization components of the antenna array of the BS, and a phase shift caused by a delay of a propagation path with the UL carrier frequency.

12. The method of claim 8, wherein each antenna element of the antenna array is decomposed into two orthogonal polarization components, wherein the two orthogonal polarization components include a vertical component of the antenna array and a horizontal component of the antenna array.

13. The method of claim 8, wherein the predicted DL channels are compensated based on a radio frequency (RF) transmit (TX) channel response of the BS on the DL carrier frequency.

14. The method of claim 8, wherein the DL channels for each propagation path are predicted for a same time slot as a measuring time slot for which the UL SRS is measured or for a subsequent time slot next to the measuring time slot, based on rates of change of each of the propagation parameters.

15. A non-transitory computer-readable medium comprising program code for operating a base station in a communication network, wherein the program code that, when executed by a processor, causes the processor to:
   measure uplink (UL) sounding reference signals (SRSs) at a UL carrier frequency, using two polarization components of an antenna array of the BS;
   determine a quantity of propagation paths between the BS and a user equipment (UE);
   for each of the determined propagation paths, extract propagation parameters from the UL SRS measurements;
   for each of the determined propagation paths, predict a downlink (DL) channel based on the extracted propagation parameters and a DL carrier frequency; and
   generate a precoding channel matrix for the UE by summing the predicted DL channels for each of the determined propagation paths and for each of the two polarization components of the antenna array of the BS.

16. The non-transitory computer-readable medium of claim 15, wherein the propagation parameters are extracted based on an antenna pattern of the antenna array,
   wherein the antenna pattern includes a set of amplitudes and phases per each antenna element of the antenna array at possible incident angles,
   wherein the antenna pattern per each antenna element is decomposed into two orthogonal polarization components.

17. The non-transitory computer-readable medium of claim 15, further comprising program code that, when executed by the processor, causes the processor to:
   calculate rates of change of each of the propagation parameters; and
   predict the DL channel further based on the rates of change of each of the propagation parameters,
   wherein the propagation parameters include at least one of incident angles at an arrival direction, a UL carrier frequency, an amplitude, an initial phase, a delay phase shift due to a delay on a propagation path at the UL carrier frequency, and a Doppler phase shift due to Doppler effect.

18. The non-transitory computer-readable medium of claim 15, wherein, further comprising program code that, when executed by the processor, causes the processor to, for each of the determined propagation paths, predict the DL channel is predicted based on an equation using a combination of:
   a BS antenna array response based on an arrival direction of a propagation path and the UL carrier frequency, for each of the two polarization components of the antenna array of the BS,
   a phase shift based on a Doppler shift at an observing time,
   a phase shift on each of resource blocks based on a delay of a propagation path, and
   a complex coefficient of a propagation path based on amplitudes and initial phases for each of the two polarization components of the antenna array of the BS, and a phase shift caused by a delay of a propagation path with the UL carrier frequency.

19. The non-transitory computer-readable medium of claim 15, wherein each antenna element of the antenna array is decomposed into two orthogonal polarization components, wherein the two orthogonal polarization components include a vertical component of the antenna array and a horizontal component of the antenna array.

20. The non-transitory computer-readable of claim 15, wherein the predicted DL channels are compensated based on a radio frequency (RF) transmit (TX) channel response of the BS on the DL carrier frequency.

* * * * *